United States Patent [19]
Sharifian et al.

[11] Patent Number: 5,281,311
[45] Date of Patent: Jan. 25, 1994

[54] PROCESS FOR REDUCING THE ACID CONTENT OF HYDROXYLAMINE SALT SOLUTIONS AND FOR PREPARING HYDROXYLAMINES FROM HYDROXYLAMINE SALTS

[75] Inventors: Hossein Sharifian; Alan R. Tanner, both of Austin, Tex.

[73] Assignee: Sachem, Inc., Austin, Tex.

[21] Appl. No.: 907,391

[22] Filed: Jul. 1, 1992

[51] Int. Cl.$^5$ ............... C25B 1/00; C25B 3/02
[52] U.S. Cl. .................. 204/101; 204/131; 204/182.4
[58] Field of Search ............ 204/101, 131, 182.4, 204/74

[56] References Cited

U.S. PATENT DOCUMENTS

| | | | |
|---|---|---|---|
| 3,766,038 | 10/1973 | Beck et al. | 204/131 |
| 4,521,285 | 6/1985 | De Witt et al. | 204/72 |
| 4,528,249 | 7/1985 | Galbraith | 429/15 |
| 4,578,159 | 3/1986 | Miles et al. | 204/98 |
| 4,584,080 | 4/1986 | Staab et al. | 204/255 |
| 4,603,118 | 7/1986 | Staab | 502/101 |
| 4,645,579 | 2/1987 | Weiss et al. | 204/182.4 |
| 4,787,964 | 11/1988 | Gordon et al. | 204/282 |
| 4,818,353 | 4/1989 | Langer et al. | 204/74 |
| 4,919,791 | 4/1990 | Miles et al. | 204/98 |
| 4,980,037 | 12/1990 | Hossain et al. | 204/130 |
| 5,069,988 | 12/1991 | Tomantachger et al. | 429/59 |
| 5,084,144 | 1/1992 | Reddy et al. | 205/104 |

FOREIGN PATENT DOCUMENTS

2602802 2/1988 France.

OTHER PUBLICATIONS

Poblotzki et al., "The Use of Oxygen-Consuming Cathodes in the Pressure Electolysis...", pp. 241–252.
Simmrock et al., "Einsatz Perfluorierter Kationenaustauscher-Membranen in Elektroyseverfahren...", pp. 10–25, (1981), (Abstract only).
Yeager, "Sauerstoff-Verzehrkathoden fur die Chloralkali-Elektrolyse", pp. 384–391, (abstract only), (1980).

*Primary Examiner*—John Niebling
*Assistant Examiner*—Arun S. Phasge
*Attorney, Agent, or Firm*—Renner, Otto, Boisselle & Sklar

[57] ABSTRACT

A process is described for reducing the acid content of a solution comprising a hydroxylamine salt and an acid, and the process is also useful for converting a hydroxylamine salt to a hydroxylamine. In one embodiment, the process of the present invention comprises the steps of:

(A) providing an electrolysis cell comprising an anolyte compartment containing an anode, a catholyte compartment containing an oxygen-consuming cathode, and an anionic membrane divider separating said compartments;

(B) providing an aqueous solution comprising an acid and water in the anolyte compartment, and an aqueous solution comprising the hydroxylamine salt, water and optionally, an acid in the catholyte compartment;

(C) charging an oxygen-containing gas to the catholyte compartment;

(D) passing a direct current through the electrolysis cell for a period of time effective to reduce the acid content in the catholyte compartment and/or to convert the salt to a hydroxylamine; and (E) recovering a hydroxylamine or a hydroxylamine salt solution containing a reduced amount of acid from the catholyte compartment.

30 Claims, 1 Drawing Sheet

PROCESS FOR REDUCING THE ACID CONTENT OF HYDROXYLAMINE SALT SOLUTIONS AND FOR PREPARING HYDROXYLAMINES FROM HYDROXYLAMINE SALTS

TECHNICAL FIELD

The present invention relates to a process for reducing the acid content of a solution comprising a hydroxylamine salt and an acid. The invention also relates to a process for preparing hydroxylamines from hydroxylamine salts.

BACKGROUND OF THE INVENTION

Hydroxylamine salts may be represented by the formulae

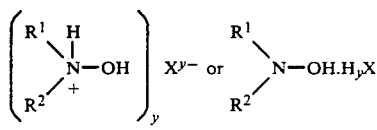

wherein $R^1$ and $R^2$ are independently hydrogen or hydrocarbyl groups, X is an anion of an acid, and y is an integer equal to the valence of X. Hydroxylamine salts are compounds which have a variety of applications. For example, hydroxylamine nitrate may be used as a component of liquid propellant and as a reducing agent in photographic operations. In some of these applications it is desirable that the hydroxylamine solution be available in high purity. Furthermore, it is particularly desirable that a solution containing the hydroxylamine salt also contain a reduced amount of acid.

Several methods have been described for manufacturing hydroxylamine salts. In the case of hydroxylamine nitrate, for example, some of these methods include: electrodialysis of hydroxylamine hydrochloride and nitric acid; reaction of hydroxylamine sulfate with barium nitrate; three-step cation exchange process employing hydroxylamine sulfate and nitric acid; and electrolytic reduction of nitric acid. Since these methods do not generally provide hydroxylamine salt solutions of the high purity required for some applications, procedures have been developed to purify the hydroxylamine salt solutions. At present, such solutions are purified using thin film evaporators, vacuum-stripping, or other procedures.

French Patent 2,602,802 is directed to an electrolytic process to directly produce high purity solutions of hydroxylamine nitrate. In particular, a process is described for producing by electrolysis a hydroxylamine nitrate solution in an electrochemical cell containing a cathode compartment, an anode compartment and a separator between the cathode compartment and anode compartment. Said process is characterized in that it includes the following operations: (a) introducing a catholyte, essentially containing an aqueous nitric acid solution, in the cathode compartment; (b) introducing an anolyte solution into the anode compartment; (c) electrolyzing the catholyte to a cathode potential between about 0.5 and 1.4 volts compared to the standard calomel electrode, while keeping the temperature of the reaction to the cathode below about 50° C., in order to produce a hydroxylamine solution; and (d) recovering the hydroxylamine nitrate solution from the cathode compartment.

U.S. Pat. No. 4,521,285 relates to an electrolytic cell and a process for removing the halide or other anion from an organic salt having as general formula $A^+ X^-$, wherein $A^+$ is an organic cation and $X^-$ is a halide or other anion. Typical compounds of this type are the hydrohalides of nitrogen gases or other salts or hydrosalts of such bases or compounds notably salts (hydrohalides) of quaternary ammonium bases or of amines or amides. However the process herein contemplated may be applied to the removal of anions, e.g., chloride, which are present as an impurity or in combination with the organic compound.

U.S. Pat. No. 4,645,579 relates to aqueous solutions of hydroxylamine which are prepared from aqueous hydroxylammonium salt solutions by electrodialysis by a method in which the aqueous hydroxylammonium salt solution is fed into the middle zone of an electrolysis cell, which is divided into a cathode zone, an anode zone and a middle zone by means of semipermeable membranes, and is electrolyzed, and the catholyte used is an alkali metal hydroxide solution containing ammonia and/or amines.

SUMMARY OF THE INVENTION

A process is described for reducing the acid content of a solution comprising a hydroxylamine salt and an acid, and the process is also useful for converting a hydroxylamine salt to a hydroxylamine. In one embodiment, the process of the present invention comprises the steps of:

(A) providing an electrolysis cell comprising an anolyte compartment containing an anode, a catholyte compartment containing an oxygen-consuming cathode, and an anionic membrane divider separating said compartments;

(B) providing an aqueous solution comprising an acid and water in the anolyte compartment, and an aqueous solution comprising the hydroxylamine salt, water and optionally, an acid in the catholyte compartment;

(C) charging an oxygen-containing gas to the catholyte compartment;

(D) passing a direct current through the electrolysis cell for a period of time effective to reduce the acid content in the catholyte compartment and/or to convert the salt to a hydroxylamine; and (E) recovering a hydroxylamine or a hydroxylamine salt solution containing a reduced amount of acid from the catholyte compartment.

DESCRIPTION OF THE PREFERRED EMBODIMENTS

In one embodiment, the process of the present invention is utilized for reducing the acid content of a solution comprising a hydroxylamine salt and an acid. In another embodiment, the process of the invention is used for preparing a free hydroxylamine from a hydroxylamine salt. The process of the present invention comprises the steps of:

(A) providing an electrolysis cell comprising an anolyte compartment containing an anode, a catholyte compartment containing an oxygen-consuming cathode, and an anionic membrane divider separating said compartments;

(B) providing an aqueous solution comprising an acid and water in the anolyte compartment, and an aqueous solution comprising the hydroxylamine salt, water and optionally, an acid in the catholyte compartment;

(C) charging an oxygen-containing gas to the catholyte compartment;

(D) passing a direct current through the electrolysis cell for a period of time effective to reduce the acid content in the catholyte compartment and/or to convert the salt to a hydroxylamine; and (E) recovering a hydroxylamine or a hydroxylamine salt solution containing a reduced amount of acid from the catholyte compartment.

The type of electrolysis cell used in the process of the present invention may be any of the known electrolysis cells, and the cells may be composed of conventional cell materials which are compatible with the materials being charged into the cells. Since the anode and cathode do not enter directly into the reaction, they may also be made of a variety of materials which do not react with the solutions added to the cells. The anodes generally may be high purity graphite or platinum electrodes or a titanium electrode coated with an oxide of a material belonging to the platinum group. Another suitable anode includes titanium coated with ruthenium oxide.

A key feature of the electrolysis cell used in the process of the present invention is the presence of an oxygen-consuming cathode in the catholyte compartment. Oxygen-consuming cathodes also have been referred to in the art as gas diffusion cathodes, air cathodes, etc.

The oxygen-consuming cathode may comprise a conventional cathode structure formed of a suitable porous hydrophobic material such as polytenfluoroethylene(PTFE), mixed with carbon black and optionally a catalyst. In one preferred embodiment, the oxygen-consuming cathode is a hydrophobic oxygen-consuming cathode comprising a porous element having a first surface portion which is in contact with the oxygen charged to the catholyte and a second surface portion which is in contact with the aqueous solution in the catholyte compartment. For example, the oxygen-consuming cathode may comprise a porous material such as a PTFE fabric or a carbon cloth fabric coated on one side with a suitable catalytic material such as carbon, graphite, platinum, silver, gold, and mixtures thereof to form a "active layer".

Figure 4:
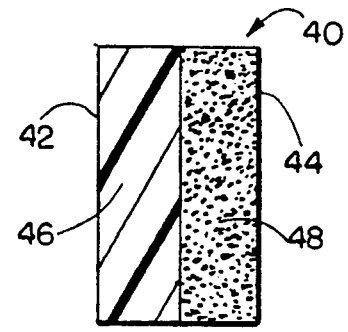
FIG. 4 is a schematic cross-section of an example of an oxygen-consuming electrode useful in the process of the present invention.

FIG. 4 is a schematic illustration of one embodiment of an oxygen-consuming electrode useful in the process of the present invention. As shown in FIG. 4, the cathode 40 is formed essentially of a two-component laminate defining the gas contacting surface 42 and the opposed electrolyte contacting surface or "active surface" 44. An electronically conductive porous gas carrier layer 46 defines the oxygen-contacting surface 42, and layer 46, for example, may comprise a mixture of a hydrophobic material such as porous PTFE and an electronically conductive material such as carbon black. Layer 48, the active layer, comprises a suitable catalytic material such as platinum, silver, gold, etc., and, optionally, carbon powder. In some instances, the materials of layer 46 and layer 48 may be intermixed into a single layer. The entire structure of cathode 40 in FIG. 4 is porous. The function of layer 46 is to allow ready transmission of oxygen to the active layer 48. Since layer 46 is hydrophobic, it serves to repel liquid electrolyte and prevent the liquid electrolyte from passing through the electrode into the oxygen side of the cell.

The oxygen-consuming cathodes utilized in the present invention promote the formation of hydroxide ions in the catholyte compartment which then react with any acid cations present in the catholyte compartment to form water, thereby reducing the acid concentration in the catholyte compartment. The hydroxide ions also may abstract a proton from the hydroxylamine salts to form free hydroxylamine. In both embodiments, liberated anions pass through the anion exchange membrane into the anolyte compartment forming additional corresponding acid.

The electrolysis is carried out in a cell comprising an anolyte compartment and a catholyte compartment. The compartments are separated by means of an anionic selective membrane. Generally, anionic membranes belong to well known classes of organic commercial polymers, often thermoplastic type, containing polar groups (weakly basic). The anionic selective membrane may be an anion exchange resin or other material, permeable to and capable of transferring anions. The membranes may comprise materials based on the fluorocarbon, polystyrene or polypropylene series. The materials, for instance, may consist of polystyrene which bears on the benzene nucleus dialkylamino groups which in turn, have been converted into quaternary ammonium ions. Additionally, it is preferable to use a durable semipermeable membrane which is acid stable. Suitable membranes include hydrogenated styrene/butadiene block copolymers, polybutadiene, polyisoprene, polyisobutylene, and a polyethylene containing the basic amine groups. A particular example of a membrane is a styrene/divinylbenzene copolymer which contains 4 to 16%, more often 6 to 8% by weight of divinylbenzene and quaternary ammonium groups as charge carriers. Such membranes are available commercially under the trade designation Raipore ® from RAI Research Corp. and Tosflex from Tosoh Corporation. For example, Raipore R1035 is an anionic exchange membrane which is a quaternized vinylbenzylamine grafted PTFE film available in 1 mil thickness. Raipore R5035 (L or H) is a quaternized vinylbenzene grafted polyethylene membrane available in 8 ml. thickness. Other suitable membranes are Neosepta from Tokuyama Soda, Selemion from Asahi Glass, PERMAPLEX A 20, AMFLON series 310 (based on fluorinated polymer substituted with quaternary ammonium) from American Machine and Foundry Co., IONAC MA 3148, MA 3236 and MA 3475 (based on polymer substituted with quaternary ammonium derived from heterogeneous polyvinyl chloride) from Ritter-Pfaulder Corp.

The anolyte compartment of the electrolysis cell contains an anode, acid and water. The concentration of the acid in the anolyte compartment is from about 1 to about 12% by weight, preferably from about 1 to about 6% by weight. The temperature is about 10° C. to about 30° C., preferably about 15° C. to about 25° C. The acid may be an organic or an inorganic acid. Generally, the anion of the acid is the same as the anion of the salt. For example, if the salt is a nitrate, the acid is nitric acid. If the salt is a sulfate, the acid is sulfuric acid.

The catholyte compartment of the electrolysis cell comprises the oxygen-containing cathode, hydroxylamine salt, water and optionally an acid. When a free hydroxylamine is the desired product of the process of this invention, the catholyte may also, and generally will contain at least one stabilizer to prevent decomposition of the free amine to ammonia. Examples of useful stabilizers include 8-hydroxyquinaldine, flavors such as morin, hydroxyquinolines such as 8-hydroxyquinoline, hydroxyanthraquinones, etc. The concentration of stabilizer in the catholyte solution may range from about 10 to about 500 ppm. The free acid which is in the catholyte solution may be an organic or inorganic acid. Generally the acid contains an anion which is the same as the anion of the salt. For example, if the salt is a nitrate, the solution in the catholyte contains nitric acid. If the salt is a phosphate, the acid is phosphoric acid.

The concentration of the hydroxylamine salt in the aqueous solution in the catholyte compartment may be from about 10 to about 25% by weight. Preferably the hydroxylamine salt concentration is about 16 to about 18% by weight. The concentration of free acid in the solution of the catholyte compartment may be from about 1 to about 12% by weight. The term "free acid" as used in this application is intended to refer to the excess acid present in the catholyte solution which is not associated with the hydroxylamine as a salt. The temperature of the catholyte is about 10° C. to about 30° C., preferably about 15° C. to about 25° C. The water, used in the solutions of the present invention, is preferably deionized water, and more preferably very pure deionized water.

The term "hydrocarbyl" is used herein to include substantially hydrocarbyl groups as well as purely hydrocarbyl groups. The description of these groups as being substantially hydrocarbyl means that they contain no non-hydrocarbyl substituents or non-carbon atoms which significantly affect the hydrocarbyl characteristics or properties of such groups relevant to their uses as described herein. Examples of hydrocarbyl substituents which might be useful in connection with the present invention include: alkyl, alkenyl, alicyclic and aromatic substituents.

The hydroxylamine salts include several embodiments. The amine of the hydroxylamine salt may have hydrogen substituents or hydrocarbyl substituents. In one embodiment, the hydroxylamine salt may be unsubstituted hydroxylamine salt. Specific embodiments of the hydrocarbyl substituted hydroxylamine salt include: diethylhydroxylamine salt, isopropylhydroxylamine salt and methylhydroxylamine salt.

The acids employed in the present invention are organic and inorganic acids. In one embodiment, the organic acid is formic or acetic acid. In another embodiment, the acid is an inorganic acid. Non-limiting examples of inorganic acids include: boric acid, hydrochloric acid, nitric acid, perchloric acid, phosphoric acid and sulfuric acid. In one preferred embodiment, the acid in the anolyte compartment is the same as the acid in the catholyte compartment, and the acid anion is the same as the anion of the salt.

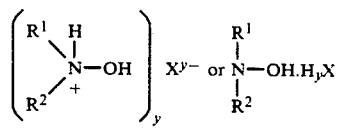

wherein $R^1$ and $R^2$ are independently hydrogen or hydrocarbyl groups containing 1 to about 6 carbon atoms, X is an anion of the acid and y is an integer equal to the valence of X. In one embodiment, the $R^1$ and $R^2$ groups contain 1 to 3 carbon atoms. Specific examples of the hydroxylamine salt include: hydroxylamine nitrate, methylhydroxylamine chloride, diethylhydroxylamine nitrate, isopropylhydroxylamine chloride, methylhydroxylamine sulfate and diethylhydroxylamine acetate.

The oxygen-containing gas which is charged to the catholyte compartment may be any oxygen-containing gas such as oxygen, atmospheric air, oxygen enriched air, etc. In one embodiment, one surface of the cathode (the backside) is contacted with oxygen, air or oxygen-enriched air in a gas-filled chamber. The oxygen-consuming reaction depends upon the oxygen diffusing from the gas side of the cathode into the liquid side of the cathode. The hydrophobic cathode does not permit liquid flow from the liquid side to the gas chamber.

Figure 1:
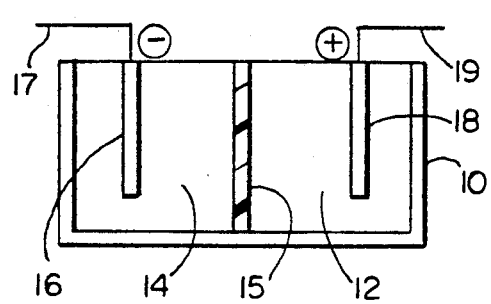
FIG. 1 is a schematic cross-section of an electrolysis cell useful in performing the process of the present invention.

A schematic cross-section or representation of an electrolysis cell useful in the process of the present invention is shown in FIG. 1. In FIG. 1, the electrolysis cell 10 comprises an anolyte compartment 12 and a catholyte compartment 14 separated from each other by a divider 15 such as an anionic selective membrane. The anolyte compartment 12 contains an anode 18 which is attached to a power supply (not illustrated) by wire 19. The catholyte compartment 14 contains an oxygen-consuming cathode 16 which is attached to a power supply (not illustrated) through wire 17.

Figure 2:
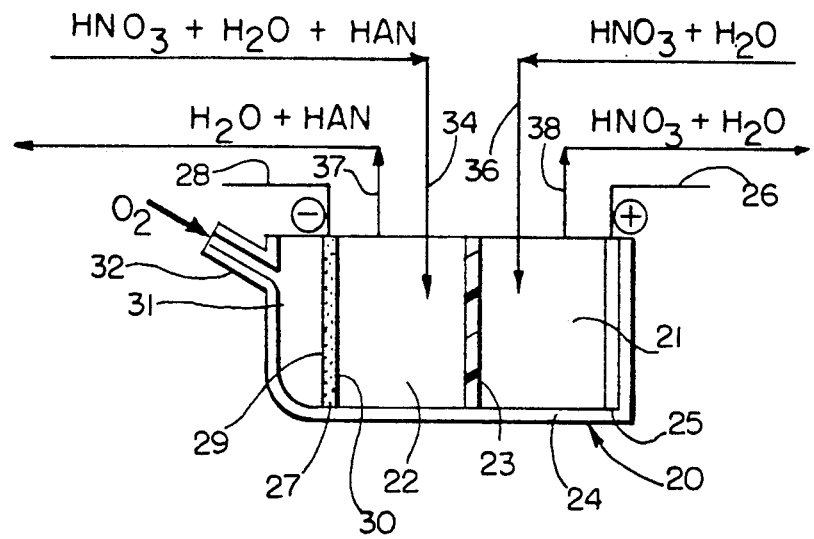
FIG. 2 is a schematic cross-section of one preferred electrolysis cell and process.

Another example of an electrolysis cell useful in the process of the present invention is shown in FIG. 2. In FIG. 2, an electrolysis cell 20 comprises an anolyte compartment 21 and a catholyte compartment 22 separated from each other by an anionic selective membrane 23 within outer housing 24. The anolyte compartment 21 contains an anode 25 which is attached to a power supply (not illustrated) by wire 26. The catholyte compartment 22 contains hydrophobic oxygen-consuming cathode 27 which comprises a porous element having a first surface 29 and a second surface 30. The first surface 29 of the cathode 27 is exposed to an oxygen-containing gas contained in a chamber 31 of housing 24, and the second surface (opposite surface) 30 of the cathode (active layer) is in contact with the aqueous solution in the catholyte compartment 22. As illustrated in the embodiment of FIG. 2, wherein the hydroxylamine salt is hydroxylamine nitrate and the acid in the anolyte compartment is nitric acid, an oxygen-containing gas is fed to chamber 31 at inlet 32. Under pressure, the oxygen passes through the cathode into the catholyte compartment 22. An anolyte comprising an acid such as nitric acid and water is supplied to the anolyte compartment as illustrated by line 36, and a catholyte comprising an aqueous solution of nitric acid and a hydroxylamine nitrate (HAN) is supplied to the catholyte compartment as shown by line 34. After passage of a direct current through the electrolysis cell whereby the acid content of the catholyte solution is reduced, at least a portion of the catholyte containing the desired hydroxylamine nitrate and water is withdrawn as shown by line 37, and the hydroxylamine nitrate can be recovered from the withdrawn catholyte. A portion of the anolyte which is concentrated in nitric acid is withdrawn as shown by line 33, and a more dilute nitric acid can be added as shown by line 36.

Alternatively, the process illustrated in FIG. 2 can be modified in the following manner to convert a hydroxylamine salt such as hydroxylamine nitrate (HAN) to a hydroxylamine. In this embodiment the solution charged to the catholyte compartment 22 as shown by line 34 comprises a hydroxylamine salt and water but little or no acid. Upon passage of an electric current, the hydroxylamine salt is converted to a hydroxylamine which can be recovered as shown by line 37. A concentrate acid solution is withdrawn from the anolyte compartment as shown by line 38.

Figure 3:
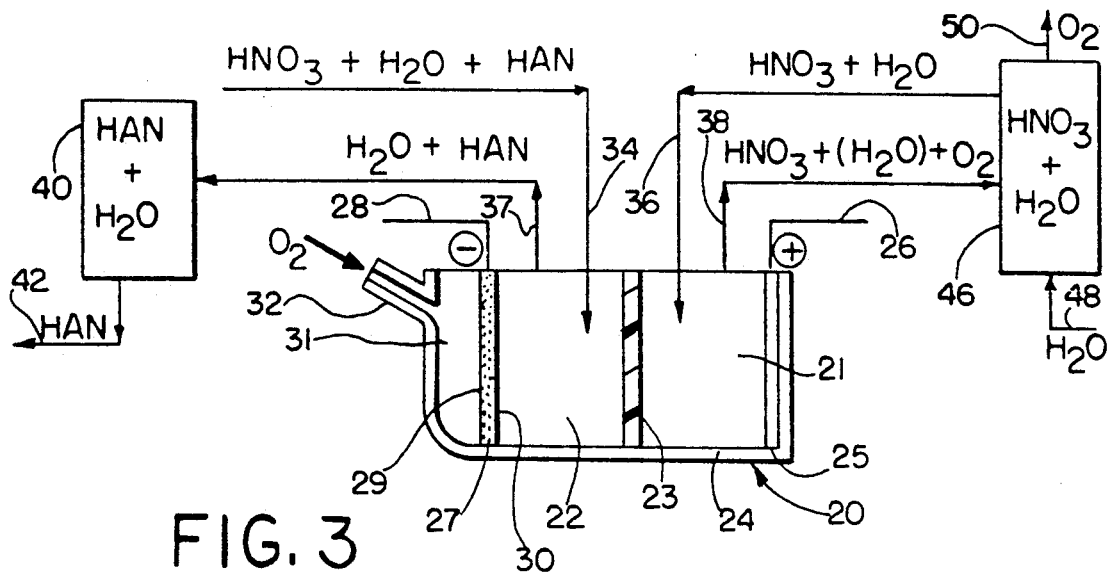
FIG. 3 is a schematic cross-section of another preferred electrolysis cell and process comprising a closed loop.

Another preferred example of an electrolysis cell and the process of the present invention is illustrated with hydroxylamine nitrate in the flow diagram of FIG. 3 which provides a closed loop with resulting favorable economics of operation. In FIG. 3, the electrolysis cell 20 and the various numbered components of the electrolysis cell have the same numbers and definition as described for FIG. 2. In the closed system illustrated in FIG. 3, after a current is passed through the electrolysis cell and the nitric acid content of the catholyte solution is reduced, at least a portion of the catholyte is withdrawn from the catholyte compartment 22 as shown by line 37 and transferred to recovery zone 40. The catholyte which is withdrawn from the catholyte compartment 22 and transferred to recovery zone 40 contains the desired hydroxylamine nitrate, water and a reduced amount of nitric acid in the solution initially charged to the catholyte compartment of electrolysis cell. The hydroxylamine nitrate is recovered from the catholyte solution in recovery zone 40 by techniques known to those skilled in the art as shown by line 42. The solution which remains after removal of the desired hydroxylamine nitrate is replenished with nitric acid as shown by line 44 and recycled to the catholyte compartment as shown by line 34.

The anolyte contained in the anolyte compartment 21 after electrolysis contains nitric acid, oxygen and a reduced amount of water as a result of the electrolysis of water and the passage of hydrogen ions through the cation exchange membrane 23 into the catholyte compartment 22. At least a portion of this anolyte is removed from the anode compartment as shown by line 38 and transferred to makeup zone 46. The amount of water in this solution is increased to the desired operating level for recycle, and this solution is charged to the anolyte compartment as shown by line 36. Oxygen which is formed during the electrolysis is removed from the solution in the makeup zone 46 is indicated by line 50. This oxygen may be used as the source of oxygen which is charged to the oxygen chamber 31 through inlet 32.

The apparatus and process described above with respect to FIG. 3 can be modified in accordance with this invention to convert a hydroxylamine salt such as hydroxylamine nitrate to hydroxylamine. In this process, the solution charged to the catholyte compartment 22 as shown by line 34 comprises water, the hydroxylamine nitrate, and little or no acid. The solution withdrawn from the catholyte compartment after passing an electric current contains water and free hydroxylamine.

In one embodiment, the aqueous solution containing the hydroxylamine salt and the acid which is provided in the catholyte compartment in step (B) is a nitrate salt prepared by the electrolysis of nitric acid and water. The preparation of the aqueous solution containing hydroxylamine nitrate and nitric acid is conducted in a separate electrolysis cell. The preparation includes passing a direct current through an electrolysis cell which comprises nitric acid and water. In particular, the electrochemical reduction of nitric acid produces hydroxylamine nitrate. An aqueous solution of hydroxylamine nitrate and nitric acid is recovered from the cell. This aqueous solution may be charged to the catholyte compartment in the electrolysis cell of the present invention.

In one embodiment of the present invention, the application of the current in the electrolysis cell described above results in a hydroxylamine salt solution in the catholyte compartment containing less acid than the original hydroxylamine salt solution provided in the compartment at the beginning of the process. Although not wishing to be bound by any theory, one possible explanation of the process is that the oxygen which contacts the oxygen-consuming electrode is converted to hydroxide ions which then neutralize the acidic cations. The anions such as $NO_3^-$, $Cl^-$, $SO_4^{2-}$, $PO_4^{3-}$, $CH_3COO^-$, etc., migrate through the membrane to the anolyte compartment where they are recovered as acid. One advantage of the process of the present invention is that the acid content in the aqueous hydroxylamine salt solution can be reduced or eliminated without the formation of ammonia, ammonium nitrate or other by-products.

The concentration of the acid in the hydroxylamine salt solution recovered from the catholyte compartment is significantly reduced as compared to the acid in the solution originally provided in the catholyte compartment. In particular, the concentration of acid in the solution recovered will be reduced to less than about 2% by weight, preferably to less than about 0.6% by weight. In other words, a high purity hydroxylamine salt solution is recovered from the catholyte compartment.

In another embodiment, the process of the present invention, the apparatus described above can be used to prepare free hydroxylamines from hydroxylamine salts. In this embodiment, the solution which is charged to the catholyte compartment contains little or no free acid, or, alternatively, if the solution charged to the catholyte compartment contains significant amounts of free acid, the process is carried out for a longer period of time wherein the free acid in the solution is removed followed by the conversion of the salt to a free hydroxylamine. The process of this embodiment generally comprises the steps of (A) providing an electrolysis cell comprising an anolyte compartment containing an anode, a catholyte compartment containing an oxygen-consuming cathode which is a hydrophobic oxygen consuming cathode comprising a porous element having a first surface portion and a second surface portion, and an anionic membrane dividing said compartments;

(B) charging an aqueous solution comprising an acid and water to the anolyte compartment and an aqueous solution comprising a hydroxylamine salt, water and optionally, an acid to the catholyte compartment wherein the catholyte is in contact with the second surface portion of the cathode;

(C) contacting the first surface portion of the cathode with an oxygen-containing gas;

(D) passing an electric current through the electrolysis cell for a period of time effective to form a hydroxylamine from the hydroxylamine salt in the catholyte compartment; and (E) recovering a hydroxylamine from the catholyte compartment. In this embodiment, as noted above, the hydroxide ions generated in the catholyte compartment abstract a proton from the hydroxylamine salt, and the anion of the salt, for example, the nitrate ion permeates through the anionic permeable membrane into the anolyte compartment where the nitrate ion reacts with water to form additional nitric acid. Examples of free hydroxylamines which can be prepared by this process include hydroxylamine, methylhydroxylamine, ethylhydroxylamine, isopropylhydroxylamine, etc.

The process of the present invention is environmentally and economically beneficial because the waste stream typically associated with such a process is virtually eliminated. It is also possible to reuse the acid recovered from the anolyte compartment. Exposure to poisonous gases is minimized because the process is conducted in solution. Thus, another benefit is the relative safeness of the process.

The following examples illustrate the novel process of the present invention. Unless otherwise indicated in the Examples and elsewhere in the specification and claims, all parts and percentages are by weight, temperatures are in degrees centigrade and pressures are at or near atmospheric.

EXAMPLE 1

An electrolytic cell is prepared generally similar to the cell described in FIG. 2. The cell contains a Raipore anionic exchange membrane (R5035) separating the anode compartment from the cathode compartment. The anode is a titanium/ruthenium oxide anode with a surface area of 50 cm². The cathode is a carbon cloth fabric with one side coated with 0.5 mg/cm² platinum on carbon black pearls 2000 (50 cm²). The uncoated carbon cloth fabric is exposed to the gas side, and the smooth active layer to the electrode side contact to the carbon cloth backed air cathode is made using a ribbed conductive plate (copper) arrangement. The solution charged to the anolyte compartment is 0.5N sulfuric acid. The solution charged to the catholyte compartment is 1.0M hydroxylamine sulfate solution containing 200 ppm of 8-hydroxyquinoline as a stabilizer to prevent decomposition of hydroxylamine to ammonia. Oxygen is fed to the cathode compartment at 1 psi and the cell is operated for a period of 18 hours at 100 ma/cm² at an average cell voltage of 7 volts and a current efficiency of 40%. A solution of 1.0M hydroxylamine is obtained in the catholyte compartment with no detectable ammonia.

EXAMPLE 2

The apparatus used in this example is the same as that used in Example 1. The solution charged to the anolyte compartment is 0.5M nitric acid. The solution charged to the catholyte comprises one liter of 2M hydroxylamine nitrate and 1M nitric acid. Oxygen is fed to the cathode compartment at about 1 psi. Electrolysis carried out over a period of 14 hours at a current density of about 100 mA/cm², an average cell voltage of 6 volts and a current efficiency of about 60%. A solution of 2.0M hydroxylamine nitrate is obtained in the catholyte compartment with no detectable ammonia and a significant reduction in the nitric acid content.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A process for reducing the acid content of a solution comprising a hydroxylamine salt and an acid which comprises the steps of:
   (A) providing an electrolysis cell comprising an anolyte compartment containing an anode, a catholyte compartment containing an oxygen-consuming cathode, and an anionic membrane divider separating said compartment;
   (B) providing an aqueous solution comprising an acid and water in the anolyte compartment, and an aqueous solution comprising the hydroxylamine salt, water and an acid in the catholyte compartments;
   (C) charging an oxygen-containing gas to the catholyte comprising;
   (D) passing a direct current through the electrolysis cell for a period of time effective to reduce the acid content in the catholyte compartment; and
   (E) recovering a hydroxylamine or a hydroxylamine salt solution containing a reduced amount of acid from the catholyte compartment.

2. The process of claim 1 wherein the oxygen-containing gas is bubbled through the solution in the catholyte compartment.

3. The process of claim 1 wherein the hydroxylamine salt is represented by the formulae:

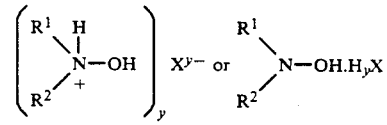

wherein $R^1$ and $R^2$ are independently hydrogen or hydrocarbyl groups containing 1 to about 6 carbon atoms, X is an anion of the acid and y is the valence of X.

4. The process of claim 3 wherein each R is hydrogen.

5. The process of claim 3 wherein $R^1$ and $R^2$ are independently hydrocarbyl groups containing 1 to about 3 carbon atoms.

6. The process of claim 1 wherein the oxygen-consuming cathode is a hydrophobic oxygen-consuming cathode.

7. The process of claim 1 wherein the oxygen-consuming cathode is a hydrophobic oxygen-consuming cathode comprising a porous element having a first surface portion which is in contact with the oxygen charged to the catholyte and a second surface portion which is in contact with the aqueous solution in the catholyte compartment.

8. The process of claim 1 wherein the oxygen-consuming cathode comprises at least one of platinum, silver, carbon and gold.

9. The process of claim 1 wherein the oxygen-containing gas is oxygen.

10. The process of claim 1 wherein the acid is an inorganic acid.

11. The process of claim 1 wherein the acid is acetic acid, hydrochloric acid, nitric acid, perchloric acid, phosphoric acid, sulfuric acid or boric acid.

12. The process of claim 1 wherein the hydroxylamine salt is hydroxylamine nitrate, methylhydroxylamine chloride, isopropylhydroxylamine chloride, methylhydroxylamine sulfate or diethylhydroxylamine acetate.

13. The process of claim 1 wherein the acid in the solution in the catholyte compartment is the same as the acid in the solution in the anolyte compartment.

14. A process for reducing the nitric acid content of a solution comprising a hydroxylamine nitrate and nitric acid which comprises the steps of:
(A) providing an electrolysis cell comprising an anolyte compartment containing an anode, a catholyte compartment containing an oxygen-consuming cathode which is a hydrophobic oxygen consuming cathode comprising a porous element having a first surface portion and a second surface portion, and an anionic membrane dividing said compartments;
(B) charging an aqueous solution comprising nitric acid and water to the anolyte compartment, and an aqueous solution comprising a hydroxylamine nitrate, nitric acid and water to the catholyte compartment wherein the catholyte is in contact with the second surface portion of the cathode;
(C) contacting the first surface portion of the cathode with an oxygen-containing gas;
(D) passing a direct current through the electrolysis cell for a period of time effective to reduce the nitric acid content in the catholyte compartment; and
(E) recovering a hydroxylamine nitrate solution from the catholyte compartment containing a reduced amount of nitric acid.

15. The process of claim 14 wherein the cathode comprises at least one of platinum, silver, carbon and gold.

16. The process of claim 14 wherein the oxygen-consuming cathode comprises a mixture of carbon and silver.

17. The process of claim 14 wherein the oxygen-consuming cathode comprises a mixture of carbon and platinum.

18. The process of claim 14 wherein the oxygen-containing gas is air.

19. The process of claim 14 wherein the oxygen-containing gas is oxygen.

20. The process of claim 14 wherein the hydroxylamine nitrate is characterized by the formula $H_2N—OH \cdot HNO_3$.

21. A process for preparing a hydroxylamine from a hydroxylamine salt which comprises the steps of:
(A) providing an electrolysis cell comprising an anolyte compartment containing an anode, a catholyte compartment containing an oxygen-consuming cathode which is a hydrophobic oxygen consuming cathode comprising a porous element having a first surface portion and a second surface portion, and an anionic membrane dividing said compartments;
(B) charging an aqueous solution comprising an acid and water to the anolyte compartment and an aqueous solution comprising a hydroxylamine salt, water and optionally, an acid to the catholyte compartment wherein the catholyte is in contact with the second surface portion of the cathode;
(C) contacting the first surface portion of the cathode with an oxygen-containing gas;
(D) passing an electric current through the electrolysis cell for a period of time effective to form a hydroxylamine from the hydroxylamine salt in the catholyte compartment; and
(E) recovering a hydroxylamine from the catholyte compartment.

22. The process of claim 21 wherein the cathode comprises at least one of platinum, silver, carbon and gold.

23. The process of claim 21 wherein the oxygen-consuming cathode comprises a mixture of carbon and silver.

24. The process of claim 21 wherein the oxygen-consuming cathode comprises a mixture of carbon and platinum.

25. The process of claim 21 wherein the oxygen-containing gas is air.

26. The process of claim 21 wherein the oxygen-containing gas is oxygen.

27. The process of claim 21 wherein in hydroxylamine salt is a salt of a hydroxylamine characterized by the formula $$H—(R^1)N—OH$$

wherein $R^1$ is hydrogen or a methyl, ethyl or isopropyl group.

28. The process of claim 21 wherein the hydroxylamine salt is a hydroxylamine nitrate and the acid charged to the anolyte compartment is nitric acid.

29. The process of claim 27 wherein the hydroxylamine salt is characterized by the formula $H_2N—OH \cdot HNO_3$.

30. A process for conversion of a hydroxylamine salt to a hydroxylamine which comprises the steps of:
(A) providing an electrolysis cell comprising an anolyte compartment containing an anode, a catholyte compartment containing an oxygen-consuming cathode, and an anionic membrane divider separating said compartments;
(B) providing an aqueous solution comprising an acid and water in the anolyte compartment, and an aqueous solution comprising the hydroxylamine salt, water and optionally, an acid in the catholyte compartment;
(C) charging an oxygen-containing gas to the catholyte comprising;
(D) passing a direct current through the electrolysis cell for a period of time effective to convert the salt to hydroxylamine; and
(E) recovering the hydroxylamine from the catholyte compartment.

* * * * *